United States Patent [19]

Despins

[11] 4,386,758
[45] Jun. 7, 1983

[54] METHOD AND APPARATUS FOR STRINGING POWER LINES ACROSS SUPPORTING TOWERS

[76] Inventor: Paul Despins, 380 Bingay St., Kimberley, British Columbia, Canada, V1A 1X4

[21] Appl. No.: 207,127

[22] Filed: Nov. 17, 1980

[51] Int. Cl.³ .................................................. B66D 1/36
[52] U.S. Cl. ........................... 254/134.3 R; 244/137 R
[58] Field of Search ............... 254/134.3 R, 134.3 PA; 294/82 R, 100; 244/137 R; 258/1.2; 248/159

[56] References Cited

U.S. PATENT DOCUMENTS

| | | | |
|---|---|---|---|
| 2,410,451 | 11/1946 | Landry | 258/1.2 |
| 2,684,025 | 7/1954 | Kurth | 248/159 |
| 4,006,884 | 2/1977 | Leterhos et al. | 254/134.3 PA |
| 4,247,084 | 1/1981 | Lindsey et al. | 254/134.3 PA |
| 4,278,237 | 7/1981 | Bergman et al. | 254/134.3 PA |
| 4,328,952 | 11/1982 | Chapman | 254/134.3 R |

*Primary Examiner*—Robert C. Watson

[57] ABSTRACT

Apparatus used to string a transmission line between supporting towers comprises an elongated needle which is adapted to be suspended from a helicopter by a hoisting cable. A plurality of latch hooks are spaced along the needle to engage a part of the transmission towers. The transmission line or a hauling line is attached to a trailing end of the needle. The attachment of the hoisting cable to the needle is by means of a hanger which can be engaged with and disengaged from the needle and selected latch hooks so that the helicopter pilot can fly his aircraft to pick up the needle and string the line through successive towers with a threading action.

8 Claims, 10 Drawing Figures

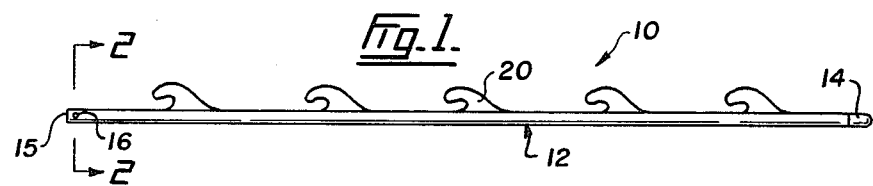
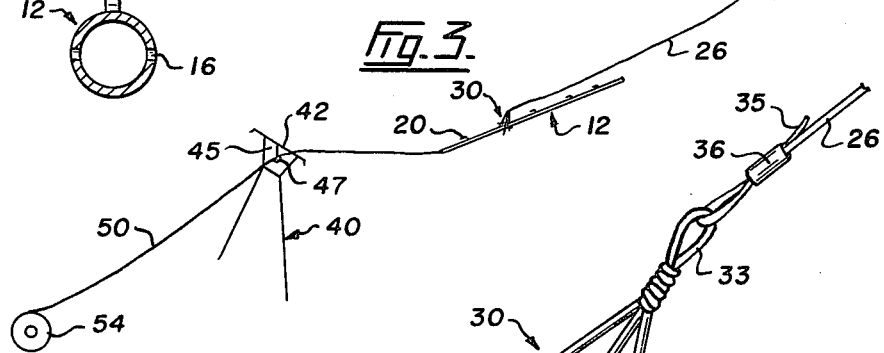
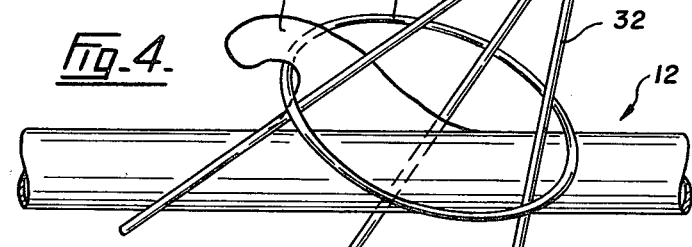

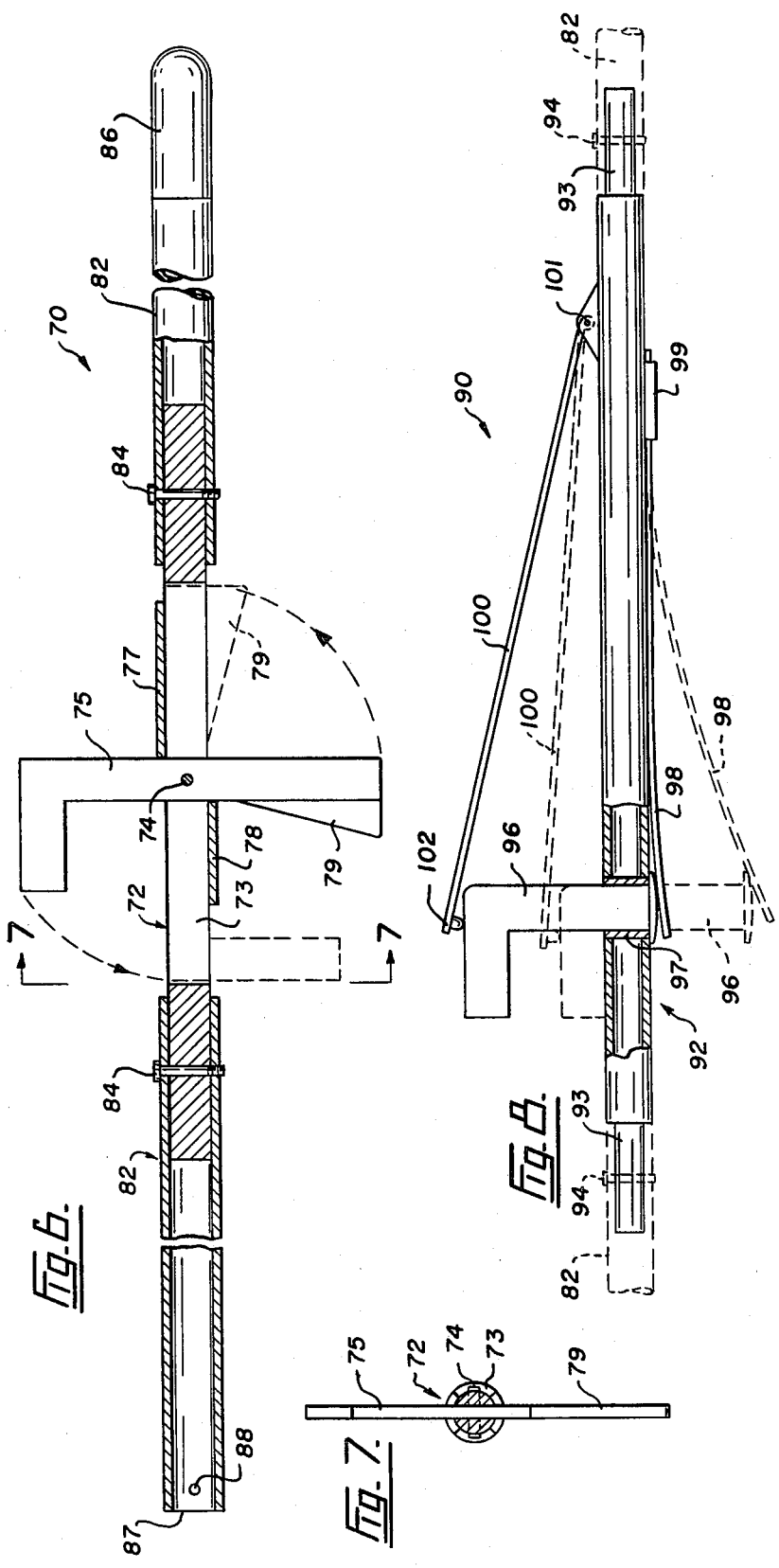

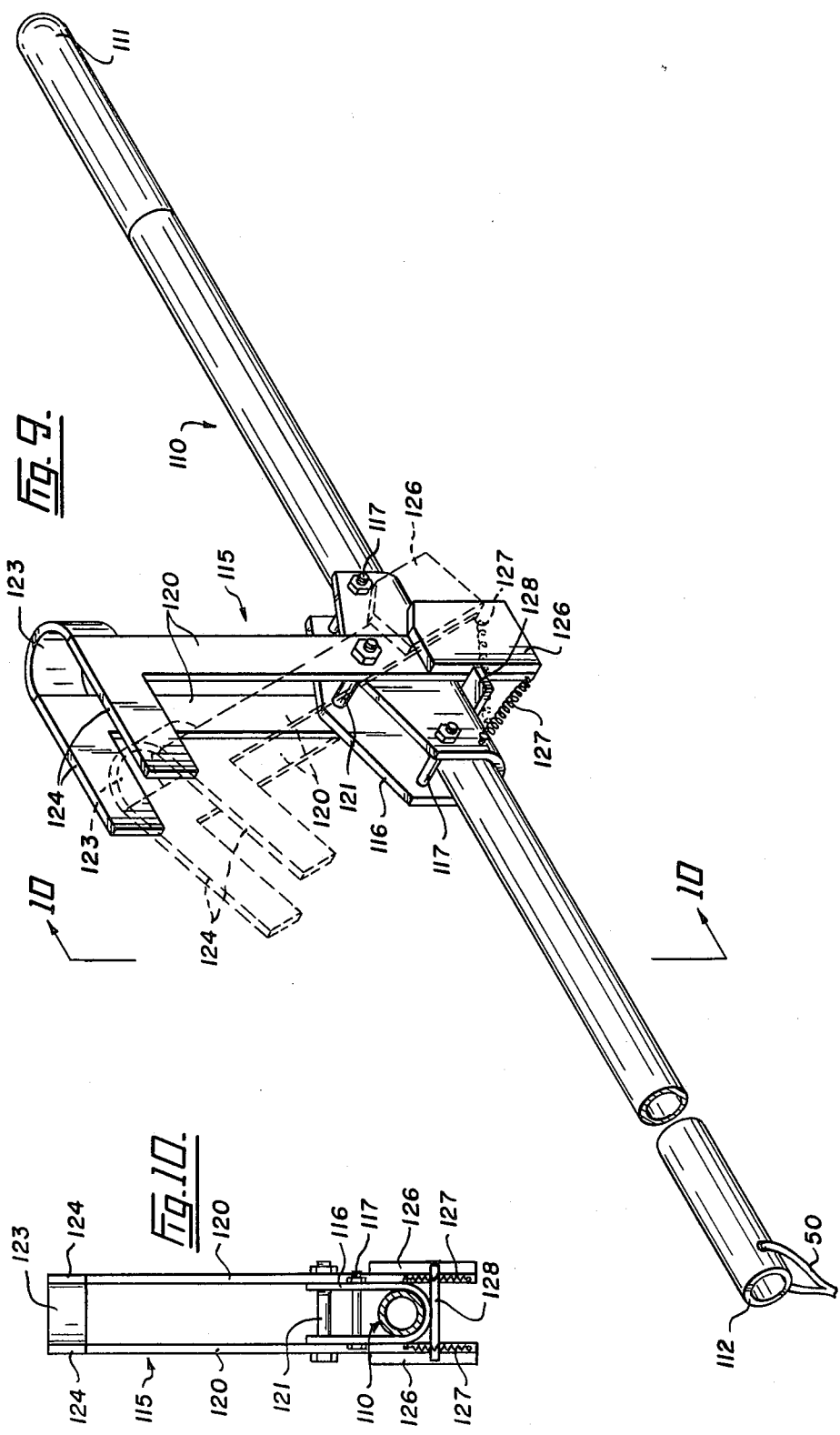

METHOD AND APPARATUS FOR STRINGING POWER LINES ACROSS SUPPORTING TOWERS

BACKGROUND OF THE INVENTION

The difficult and often time consuming task of rigging power transmission lines has been made easier in recent years by the use of helicopters which raise the transmission cables and pull them between the transmission towers. A number of U.S. patents have been granted for equipment which allow aerial stringing of cables to be done and, of these, the following patents disclose the type of equipment which presently is available; U.S. Pat. No. 4,006,884 issued on Feb. 8, 1977 to Donald A. Lederhos, U.S. Pat. No. 3,868,089 issued on Feb. 25, 1975 to Keith E. Lindsey; U.S. Pat. No. 4,129,287 issued on Dec. 12, 1978 to Keity E. Lindsey; U.S. Pat. No. 3,586,256 issued on June 22, 1971 to Bertie William Wellman.

Only the patent granted to Lederhos addresses itself to the problem of placing a transmission cable on a portion of a tower which cannot be entered from above or from the side of the tower. This particular patent discloses a cable-catching device which must be secured to the towers and a disengageable connector employing a rather complex interconnecting parts. The operation of such a device demands a high degree of skill and a great deal of patience on the part of a helicopter pilot and these as well as other disadvantages inherent in the device may explain why it has not found greater acceptance.

SUMMARY OF THE INVENTION

The present invention relates to apparatus which enables a line to be threaded through a tower opening using a helicopter to do the line hauling and threading. In its simplest form, the apparatus comprises an elongated needle having fixed latch hooks projecting laterally from the needle and being suitably spaced longitudinally therealong. The line to be threaded is attachable to the trailing end of the elongated needle and the hoisting cable which depends from the hovering helicopter is releasably secured to the needle by a hanger. On this hanger there are guiding an holding elements which allow the hanger to be lowered into temporary gripping engagement with the needle so that the threading operation can be performed with greater ease and speed than is possible using presently available equipment.

BRIEF DESCRIPTION OF THE DRAWINGS

FIG. 1 is a perspective view showing the present apparatus for stringing power lines across supporting towers, FIG. 2 is an enlarged transverse section taken on the line 2—2 of FIG. 1, FIG. 3 is a perspective view of the apparatus in a position of use.

FIG. 4 is an enlarged view showing details of a hanger and a needle of the apparatus, FIG. 5 is a perspective view showing the needle attached to a portion of a transmission tower, FIG. 6 is a part side elevational, part sectional view showing another embodiment of the needle, FIG. 7 is a vertical section taken on the line 7—7 of FIG. 6, FIG. 8 is a side elevation with part in section showing a third embodiment of the needle, FIG. 9 is a perspective view showing a forth embodiment of the needle, and FIG. 10 is a vertical section taken on the line 10—10 of FIG. 9.

DESCRIPTION OF THE PREFERRED EMBODIMENTS

Referring to FIG. 1 of the drawings, the numeral 10 indicates generally a simplified embodiment of the present apparatus. In this embodiment, the apparatus 10 is shown to comprise a needle 12 which preferably is formed of suitably interconnected sections using tubular material possessing lightness and strength. The needle 12 may be some 50 feet or so in length and have an outside diameter of over 4 inches. In FIG. 1 the needle will be seen to have a tip or leading end 14 and a head or trailing end 15. Near the end 15; the hollow, cylindrical needle is drilled to provide transversely aligned holes 16 as shown best in FIG. 2.

Mounted on the upper edge of the needle 12 is a plurality of latch hooks 20. These outwardly-projecting latch hooks are equidistantly spaced apart along the needle at suitable intervals which may be 8 or 10 feet. The hooks 20 are directed towards the trailing end 15, that is, the spaces defined by the overhanging bills of the hooks are enterable from that end of the needle. FIG. 1 shows five such hooks on the sectional needle but it will be appreciated that more can be added if desired and that the needle can have as little as three hooks.

The needle 12 is adapted to be moved from transmission tower to another by a helicopter which is indicated by the numeral 25 in FIG. 3. For this purpose, the aircraft is provided with a power winch (not shown) for operating a hoisting cable 26. Since this cable must be releasably attached to the needle, the present apparatus includes a hanger 30.

The hanger generally indicted at 30 is shown best in FIG. 4 to comprise a tripod-like structure which may be constructed of heavy wire to provide legs 32 which are joined together at the top by an eye 33. The lower end 35 of the hoisting cable 26 is looped through this eye and is secured by a clamp 36. The three legs 32 are joined together by a transversely extending ring 38, the ring being spaced about midway between the lower end of the legs and the eye 33. It should be noted the ring 38 is several feet in diameter and the legs are proportionately long so that the hanger 30 can readily grip and support the needle as will be described later.

Referring again to FIG. 3, the numeral 40 indicates a typical transmission tower of the type which is erected at widely spaced intervals to carry high tension conductors. The tower illustrated is shown to have an upper structure on which a cross member or bridge 42 is carried. The opposite ends of the bridge 42 overhang adjoining parts of the structure and therefore it is relatively easy to string transmission lines between these overhanging ends using a helicopter and presently available equipment. However, the bridge 42 and the substantially V-shaped upper structure immediately below that bridge define a window or opening 45 which is commonly referred to as the center phase of the tower and it is this opening which is threaded by means of the present invention.

The transmission lines are pulled from tower to tower during the stringing operation and, for this purpose, it is common practice to use a stringing block 47 which is shown best in FIG. 5 although it can be seen in schematic FIG. 3 as well. This open-sided pulley block is temporarily attached to the bridge 42 of a tower so as to hang downwardly in the opening 45 and the block is suitably secured to a part of the tower in such a way that the block itself cannot rotate about a vertical axis.

A helicopter with sufficient power might be used to pull the transmission lines between the towers but the usual practice in line stringing is first to string a lightweight hauling line and later use the light line to pull the relatively heavy conductors from tower to tower. In FIGS. 3 and 5, such a hauling line is designated by the numeral 50. One end 51 of this cable is threaded through the holes 16 in the trailing end 15 of the needle and is doubled back upon itself where it is secured by a clamp 52, see FIG. 5. This arrangement provides a simple and effective means of detachably securing one end of the line 50 to the trailing end 15 of the needle.

The hauling line 50 normally is wound on a reel 54 (FIG. 3 only) and the rotational speed of this reel can be controlled by a suitable brake (not shown) when the line is pulled between the towers by the helicopter.

In operation, the reel 54 is positioned a suitable distance from the first tower and the hauling line 50 is connected to the needle 12. The helicopter hovers above the needle and lowers its hoisting cable 26 to the ground where a workman attaches the hanger 30 to the needle. This is done by straddling the needle with the lower ends of the legs so that the ring 38 can engage one of the latch hooks. Proper engagement is made when a portion of the ring 38 extends beneath the selected latch hook 20, preferably a hook near the trailing end 15, and another portion of the ring spaced 180° from the first portion bears against the top of the needle.

The helicopter now climbs and moves forward to the first tower. The ground crew in the meantime, maintains appropriate tension on the hauling line 50 as the needle is trailed below the aircraft attached to the hoisting cable 26 by the hanger. This arrangement keeps the needle reasonably straight and horizontal with the several latch hooks projecting upwardly. The needle is aimed through the opening 45 and is kept as close as possible to the underside of the bridge 42. When the bridge is contacted by the hanger 30, the helicopter moves back and forth slightly until a latch hook 20 in front of the hook engaged by the ring 38 attaches itself to the front structural member of the tower 40 as shown in FIG. 5. The aircraft now reverses to disengage the hanger 30 from both the needle and the latch hook originally engaged by the ring 38. This maneuvers leaves the needle attached to the bridge 42 by the forward latch hook. With the cable 26 trailing the hanger 30 below the aircraft; the helicopter first climbs then moves forward, and then descends so that the hanger is lowered into engagement with the needle 12 immediately ahead of the tower. A skilled pilot can reattach the hanger to the needle since the legs 32 readily straddle the device and the ring 38 can be passed under the hook with a certain amount of maneuvering. The aircraft now is flown forwards to pull the needle 12 off the bridge 42 so that the needle and the hauling line are, in effect, threaded through the opening 45.

Next, the needle is moved sideways by lateral movement of the helicopter so as to place the line 50 on top of the pulley carried by the stringing block 47. Once this is done, the hauling line can readily be pulled to the next tower by the forward flying aircraft.

The line is strung from tower to tower in this manner until the last tower of a series is reached whereupon the needle 12 is lowered to the ground. It will be appreciated that the hanger must periodically be moved back to one of the latch hooks near the trailing end of the needle. This is done with the needle attached to the tower so that the hanger can progressively be moved back and the needle hitched forward on the tower.

When the last of a series of towers is threaded in this manner, the hanger 30 is detached from the needle and the end 51 of the line is wound around a hauling winch, not shown. The opposite end of the hauling line 50 is attached to a transmission line (also not shown) and the winch is used to pull both lines over the blocks 47 and through the openings 45 to string the transmission line as intended. Workmen can then climb the towers and transfer the conductor from the blocks 47 to insulators which normally are attached to the bridge to support the lines.

Referring now to FIGS. 6 and 7, the numeral 70 indicates generally a modified needle which is made up of a number of joined-together parts including a latching section 72. The section 72 is formed of a length of cylindrical material in which a longitudinal slot 73 is formed. A hinge pin 74 is provided in the center of the latching section and a latch hook 75 is swingingly mounted on this pin to rock within the slot.

Secured to the section 72, is a stop plate 77 which blocks the top of the slot 73. Another stop plate 78 is secured to the underside of the section to extend across the slot on the opposite sides of the latch hook to the first stop plate. Thus, the hook 75 is mounted to swing through 90° in each direction into and out of the slot or between what will herein be referred to as a retracted and an extended position. Normally the latch hook is required to be in the extended position and, in order to bias the hook towards this position, the hinged leg of the hook is fitted with a weight 79. This weight and the two stop plates normally support the hinged leg of the latch hook in a perpendicular position with respect to the longitudinal axis of the section 72 and with the relative short leg of the hook projecting towards the trailing end of the needle.

A suitable number of the latching sections 72 are connected by sections 82 to assemble a needle 70 of the required length. The connecting sections 82 are provided in sets which vary in length. For example, it may be desired to space the latch hooks ten feet apart along the needle and therefore sections 82 of appropriate length would be used to provide this spacing. Each section 82 preferably is of tubular construction so that opposite ends can telescopically receive adjoining ends of the latching sections 72 as shown in FIG. 6. A bolt 84 or other suitable fastener is used to connect the telescoping ends of the sections 72 and 82 which make up the needle 70. In FIG. 6, it will be seen that one section 82 provides this embodiment of the needle with a rounded leading end 86 while another section provides a trailing end 87. Transversely aligned holes 88 are formed in the end 87 to provide means for attaching the hauling line 50 as previously described.

The modified needle 70 is adapted to be attached to the hauling cable 26 depending from the helicopter by means of the hanger 30. It will be appreciated that the hanger is capable of gripping one of the hooks 75 in the same manner as it is shown gripping one of the hooks 20 in FIG. 4. With the needle supported below the hovering machine in this manner, the aircraft is flown up to a transmission tower and the needle is threaded part way through the opening 45. One of the latch hooks forward of the one gripped by the hanger is hooked onto a structural member on the underside of the bridge 42 and this momentarily hangs the needle on the tower. In other words, the previously described threading procedure is followed to string the line 50 between a series of adjacent towers.

FIG. 8 shows still another modified needle generally indicated by the numeral 90. This needle is assembled using the previously described sections 82 and latching sections 92 to provide a needle of the required length. To facilitate such an assembly, opposite ends of each latching section 92 are provided with cylindrical spigots 93 which are received in the ends of the connecting sections 82 where they are secured against withdrawal by means of bolts 94 or other suitable fasteners.

The sections 92 each carry a latch hook 96 which is slidably mounted in a bushing 97 for reciprocatory movement in a fixed path perpendicular to the longitudinal axis of the needle. A leaf spring 98 is secured as at 99 to the underside of the section and the rear or distal end of this spring bears against the latch hook normally to urge the hook towards the extended position shown in FIG. 8.

A preferred means of retracting the latch hook is shown to be a slightly resilient presser bar 100 one end of which is pivotally mounted as at 101 to the top of the section near the forward end thereof. The rearmost end 102 of the presser bar slidably engages the rearwardly-projecting legs of the latch hook in a manner which will cause the hook to retract against the force applied by the spring 98 when a downwardly directed force is applied to the bar.

The needle 92 is also attached to the hoisting cable 26 by means of the hanger 30 and operates as previously described.

FIGS. 9 and 10 show still another modified needle which is generally indicated at 110. This needle has a leading end 111 and a trailing end 112 to which the hauling line 50 is secured as previously described. The numeral 115 indicates a preferred type of latch hook for this particular needle. Only one such hook is shown in FIGS. 9 and 10 but it will be appreciated that three or more identical hooks are provided. The hooks 115 are each mounted on a U-shaped saddle 116 which enmbrace the body of the needle and is capable of sliding therealong. Bolts 117 extend through the upwardly-projecting sides of the saddle to clamp the structure to the needle.

Each hook 115 double legs 120 which are spaced apart to extend over the saddle, the legs being secured to the sides of the saddle by a pivot bolt 121. A curved bridge piece 123 interconnects the rearwardly projecting legs 124 of the hook. The lower ends of the legs 120 are fitted with weights 126 which bias the hook to the normal extended position shown by solid lines in FIG. 8. Also springs 127 may be used to secure the weighted ends of the legs to the saddle and thus increase the biasing action. In the extended position, the legs 124 abut a stop 128 which is provided to extend transversely beneath the saddle 116.

The needle 110 is assembled with the required number of hooks 115 and the hooks are longitudinally spaced apart according to the size and type of transmission tower which is to be threaded as previously described.

From the foregoing description of the invention generally, it will be apparent that apparatus is provided which will greatly reduce the time and effort which normally is required to string towers. The needle can be varied in length to suit the type and size of towers and can be fitted with the required number of hooks. This versatility allow the apparatus and method to be used on large steel towers and on relatively small poles carrying a simple cross arm for suspending the transmission lines. The apparatus is particularly intended for use in threading the opening or center phase of a steel tower but it has proven useful as well in attaching a line to the overhanging ends of the bridge on the tower. In either situation, there is no need for workmen to be present on the towers during the threading operation which can be dangerous.

I claim:

1. Apparatus for stringing a line across supporting towers using a helicopter trailing a hoisting cable, said apparatus comprising;
a needle having leading and trailing ends,
means for detachably securing one end of the line to the trailing end,
a plurality of latch hooks longitudinally spaced along the needle between the leading and trailing ends, said latch hooks projecting outwardly from the needle and being directed towards the trailing end,
each latch hook being mounted on the needle for movement about a transverse axis between a normal extended position and a retracted position;
biasing means on each latch hook tending to swing said hooks towards the extended position; and
A hanger attachable to the hoisting cable for releasably gripping the needle whereby said needle can be flown to a position projecting across a part of a supporting tower and be detachably secured thereto by one of the latch hooks.

2. Apparatus as claimed in claim 1, in which said hanger has guiding members for locating the hanger over the needle on the supporting tower, and a gripping member for engaging one of the latch hooks and an adjacent part of the needle.

3. Apparatus as claimed in claim 1, in which said plurality of latch hooks are each mounted on a latching section, and means for detachably connecting the latching sections to one another whereby the needle is adjustable as to length.

4. Apparatus for stringing a line across supporting towers using a helicopter trailing a hoisting cable, said apparatus comprising:
a needle having leading and trailing ends,
means for detachably securing one end of the line to the trailing end,
a plurality of latch hooks longitudinally spaced along the needle between the leading and trailing ends, said latch hooks projecting outwardly from the needle and being directed towards the trailing end, said latch hooks each being mounted on the needle for swinging movement about a transverse axis and having an upper end and a lower end, said lower end being weighted to overbalance the upper end whereby each latch hook normally is biased towards an extended position perpendicular to the longitudinal axis of the needle, stop means on each needle for preventing swinging movement of the latch hook away from the extended position towards the leading end of the needle, and
a hanger attachable to the hoisting cable for releasably gripping the needle whereby said needle can be flown to a position projecting across a part of a supporting tower and be detachably secured thereto by one of the latch hooks.

5. A method of threading a line across a supporting tower using a helicopter comprising the steps of:

attaching the line to an elongated threading device having a plurality of latch hooks longitudinally spaced along the threading device, said latch hooks projecting outwardly from the threading device and being directed towards an end of the threading device adapted to be the trailing end during the threading of the line, each latch hook being mounted on the threading device for movement about a transverse axis between a normal extended position a retracted position and biasing means on each latch hook tending to swing said hooks towards the extended position;

releasably securing the threading device to a hanger attached to an end of a hoisting cable depending from the helicopter, flying the helicopter forward to traverse the tower with the threading device and to engage the latch with a part of said tower, maneuvering the helicopter to release the hanger from the threading device in front of the tower and to resecure the hanger to the threading device to the rear of the tower, and again flying the helicopter forward to disengage the latch from the tower and pull the threading device beyond the tower and thread the line through the tower.

6. The method as claimed in claim 5, and including the additional steps of initially suspending a pulley block from the tower, and moving the line onto the pulley block immediately after pulling the threading device beyond the tower.

7. The method as claimed in claim 6, and including the additional steps of lowering the threading device to the ground, releasing the hanger from the threading device, securing a transmission line to the opposite end of the first mentioned line, and winding in the first mentioned line to pull the transmission line through the tower.

8. Apparatus for stringing a line across supporting towers using a helicopter trailing a hoisting cable, said apparatus comprising;

a needle having leading and trailing ends, means for detachably securing one end of the line to the trailing end, a plurality of latch hooks longitudinally spaced along the needle between the leading and trailing ends, said latch hooks projecting outwardly from the needle and being directed towards the trailing end, and a hanger attachable to the hoisting cable for releasably gripping the needle, said hanger comprising a wire tripod having an eye secured to the hoisting cable spaced legs diverging downwardly from the eye, and a ring interconnecting the legs between the eye and lower ends of said legs, whereby said needle can be flown to a position projecting across a part of a supporting tower and be detachably secured thereto by one of the latch hooks.

* * * * *